Nov. 11, 1924.
P. H. GASKINS
LUBRICATING DEVICE
Filed Nov. 21, 1923
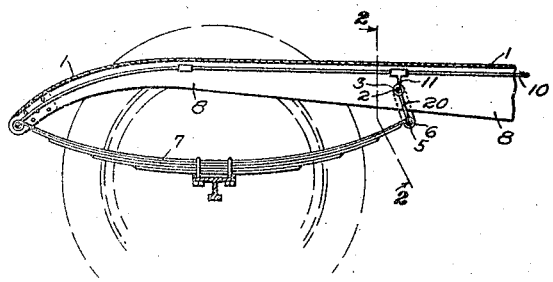
Fig. 1
Fig. 2
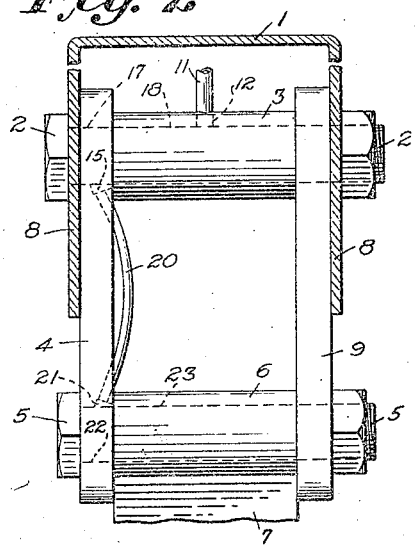
Fig. 4
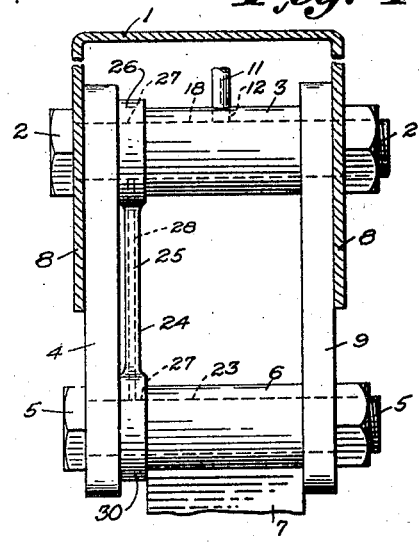
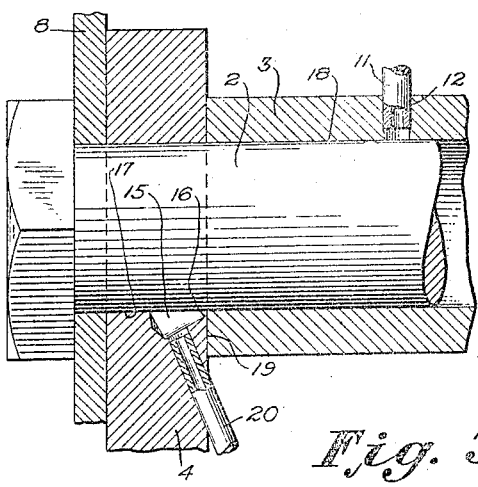
Fig. 3
Fig. 5
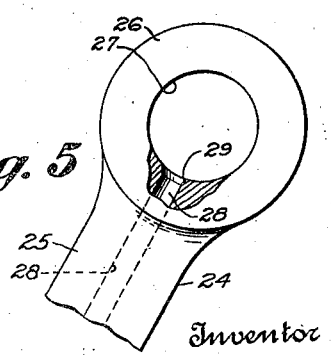
Inventor
P. H. Gaskins
by F. A. Witherspoon
Attorney Patented Nov. 11, 1924.

1,515,196

UNITED STATES PATENT OFFICE.

PALEMON H. GASKINS, OF JACKSONVILLE, FLORIDA.

LUBRICATING DEVICE.

Application filed November 21, 1923. Serial No. 676,145.

*To all whom it may concern:*

Be it known that I, PALEMON H. GASKINS, a citizen of the United States, residing at Jacksonville, in the county of Duval and State of Florida, have invented certain new and useful Improvements in Lubricating Devices; and I do hereby declare the following to be a full, clear, and exact description of the invention, such as will enable others skilled in the art to which it appertains to make and use the same.

This invention relates to lubricating devices, and has for its object to improve the constructions heretofore proposed.

With this and other objects in view, the invention consists in the novel details of construction and combinations of parts, as will be more fully hereinafter described and particularly pointed out in the claims.

Referring to the drawings, forming a part of this specification, and in which like numerals designate like parts in all the views:

Figure 1 is a diagrammatic view partly in section showing the invention as applied to the spring suspension of an automobile;

Figure 2 is a sectional view taken on the line 2—2 of Figure 1, and looking in the direction of the arrows;

Figure 3 is an enlarged sectional view of some of the parts shown in Figure 2;

Figure 4 is a view similar to Figure 2 showing a modification of the invention; and Figure 5 is an enlarged partial view of one of the parts shown in Figure 4.

This invention is an improvement over the construction disclosed in my Patent #1,433,612 granted October 31, 1922.

In the drawings, 1 indicates the usual channel forming a side frame member of the chassis of an automobile. Passing through the depending flanges 8 of the channel 1 is the upper shackle bolt 2 provided as usual with the sleeve 3 and the shackle links 4 and 9. The lower shackle bolt 5 passes through the turned over end 6 of the vehicle spring 7, and is supported by the said links 4 and 9, all in the manner well known, and shown in Figures 1, 2 and 4.

10 indicates any suitable pipe or other conveying means adapted to carry oil or other lubricant to the movable parts of the vehicle. As shown in Figure 1, the pipe 10 is conveniently located within the channel frame member 1 and is tapped as by the branch or nipple 11 adapted to furnish the said oil to the upper shackle bolt 2 and its sleeve 3. This is accomplished by securing one end of the nipple 11 in the bore 12 of the sleeve 3 in any well known suitable way. Preferably the said bore 12 is located equidistant the ends of the sleeve 3 in order to obtain equal lubrication.

It is well known that any lubricant in a bearing of this character will seep out at the ends of the sleeve 3, and run down the adjacent surfaces before its lubricating qualities have been entirely used. Therefore, it is the purpose of this invention, when more specifically stated, to overcome this wasteful, as well as objectionable, condition by putting to use this only partly spent oil or lubricant which would ordinarily escape.

To this end one of the shackle links such as 4 is provided with the pocket 15 having its bottom inclined downwardly as clearly shown in Figure 3. The pocket 15 is further so formed in the link 4 that the outer edge 16 of said pocket is slightly below the bore 17 through which the bolt 2 passes.

From the foregoing, it will now be seen that oil in pipe 10 will pass through the nipple 11 and form a thin lubricating film in the bearing 18 formed by the shackle bolt 2 and the sleeve 3. When the film of oil reaches the end of the sleeve 3 it will flow downwardly and seek an escape through the joint 19 between the sleeve 3 and the shackle link 4. But in so doing a portion of the said oil will be caught by the outer edge 16 of the pocket 15, and be directed into the said pocket along the inclined bottom thereof.

The pocket 15 is connected as by the pipe or passage 20 (see Figure 2) to a pocket 21 similar in every respect to the said pocket 15 and formed in the link 4 at the bore 22 taking the lower shackle bolt 5. Thus the oil collecting in pocket 15 will pass downwardly through the said tube or passage 20 into pocket 21 and out to the bearing 23 formed by the lower shackle bolt 5 and the turned over end 6 of the vehicle spring 7. In this manner it will thus be seen, lubricant which would ordinarily escape from the upper shackle bolt bearing is collected and again used to lubricate the lower shackle bolt bearing.

In the modified form of the invention shown in Figures 4 and 5, instead of the pockets 15 and 21 and the tube 20, all carried by the shackle link 4, I provide a separate link member 24 comprising a web or shank 25 connecting heads 26 and 30. These heads 26 and 30 are alike in every respect and each is transversely bored as at 27 to receive the shackle bolts 2 and 5. Passing through the web 25 of this link member 24 and connecting the bolt bores 27 is a passage 28 having its extremities flared or enlarged as at 29 to provide a pocket or lead for the oil. Thus it will be seen that oil from the supply pipe 10 will pass through the nipple 11, lubricate the bearing 18 formed by the shackle bolt 2, and its sleeve 3, and flow to the extremities of the bearing, all in the manner as is well known. But in so passing to the said extremities of the bearing, a portion of the oil will enter the flared end 29 of the passage 28 and flow through the said passage and out the other end thereof into the bearing of the lower shackle bolt 5.

It will now be seen that in each of the forms of this invention, I am enabled to avoid boring axially and radially the shackle bolts 2 and 5, for the conduction of oil because said oil is led directly through the bearing 3 to the bolt 2 and through the inner bore or bearing of the link 4 or 24 to the surface of the bolt 5. I thereby also avoid the difficulties heretofore encountered in connecting the axial passages thus produced in said bolts. Instead of this former construction, I employ the connections 20 or 28 between the outside surfaces of said bolts 2 and 5, as well as the pockets 15 and 21 or flared ends or pockets 29, and am thus enabled to use the same oil twice.

It is obvious that those skilled in the art may vary the details of construction as well as the arrangements of parts without departing from the spirit of the invention, and therefore I do not wish to be limited to the above disclosure except as may be required by the claims.

What I claim is:

1. In a lubricating device for the shackle connections of a vehicle spring suspension, the combination of a source of lubricant supply; an upper shackle bolt; a lower shackle bolt; direct connection between said supply and the bearing surface of one of said bolts; and direct connections for leading the used oil from the bearing surface of said last named bolt to the bearing surface of said other bolt.

2. In a lubricating device for the shackle connections of a vehicle spring suspension, the combination of an upper and a lower shackle bolt; links connecting said bolts; means for supplying oil directly to the bearing surface of said upper bolt; and means associated with one of said links for leading the oil after it has been used by said upper bolt to the bearing surface of said lower bolt.

3. In a lubricating device for the shackle connections of a vehicle spring suspension, the combination of an upper and a lower shackle bolt; bearing surfaces in which said bolts are supported; a pocket with an inclined bottom provided in said bearing surfaces; means for supplying oil through one of said bearing surfaces to the surface of said upper bolt and to one of said pockets; and connections between said pockets for leading the used oil from the surface of said upper bolt to the surface of said lower bolt.

4. In a lubricating device for the shackle connections of a vehicle spring suspension, the combination of an upper and a lower shackle bolt; bearing surfaces in which said bolts are supported comprising the bores of connecting links; a pocket with an inclined bottom provided in said bearing surfaces; means for supplying oil through one of said bearing surfaces to the surface of said upper bolt and to one of said pockets; and connections between said pockets for leading the used oil from the surface of said upper bolt to the surface of said lower bolt.

5. In a lubricating device for the shackle connections of a vehicle spring suspension the combination of an upper and a lower shackle bolt; a pair of sleeves constituting a portion of the bearings for said bolts; a link connection provided with bores having pockets and also provided with a passage joining said pockets and constituting another portion of the bearings for said bolts; an oil supply; and connections leading oil through the sleeve of said upper bolt whereby said oil may be first used on the surface of said upper bolt and then lead to the surface of said lower bolt.

6. In a lubricating device for the shackle connections of a vehicle spring suspension, the combination of an upper and a lower shackle bolt; a sleeve for said upper bolt; a sleeve for said lower bolt; a link connecting said upper and lower bolts provided with bores forming bearings for said bolts; a pocket in each of said bores having an inclined bottom; a passage joining said pockets; an oil supply, and connections leading oil through the sleeve of said upper bolt whereby oil may be first used on the surface of said upper bolt and then lead to the surface of said lower bolt.

7. In a lubricating device for the shackle connections of a vehicle spring suspension, the combination of an upper and a lower shackle bolt; a sleeve for said upper bolt provided with a radial bore; a sleeve for said lower bolt; a link connecting said upper and lower bolts provided with transverse bores forming bearings for said bolts; a pocket in each of said bores having an inclined bottom; a passage joining the bottoms of said pockets; an oil supply; and connections leading oil through the radial bore of the sleeve of said upper bolt whereby oil may be first used on the bearing surface of said upper bolt and then lead to the bearing surface of said lower bolt.

In testimony whereof I affix my signature.

PALEMON H. GASKINS.